Feb. 10, 1953

L. A. PAINE ET AL 2,628,114

INDICATOR MOUNTING

Filed May 8, 1946

Inventors.
Louis A. Paine +
William J. Dorsam
By:- Louis Robertson
Atty.

Patented Feb. 10, 1953

2,628,114

UNITED STATES PATENT OFFICE 2,628,114

INDICATOR MOUNTING

Louis A. Paine, West Lafayette, and William J. Dorsam, Lafayette, Ind., assignors to Duncan Electric Manufacturing Company, Lafayette, Ind., a corporation of Illinois Application May 8, 1946, Serial No. 668,262

2 Claims. (Cl. 287—53)

In certain meters and in other mechanism, it is highly desirable to be able to adjust and dependably set a pointer or other member with respect to the shaft by which it is carried. For example, in thermal demand meters, the pointer must be set at the proper distance from the scale and must be set to zero after the meter has reached a stable condition with no current being used in the measured circuit. It is also desirable that the pointer have such a position with respect to the shaft that the calibrating tensioning spring will exert no torque on the shaft when the pointer is in the zero position. At the same time, it is essential that the pointer be firmly locked to the shaft so that there will be no danger of slippage between the pointer and the shaft. In the past, it has been common to secure pointers to shafts either by a drive fit between the shaft and the pointer or by a set screw screwed into the side of the pointer hub and engaging the shaft. In the case of instruments in which a hair spring is secured to the hub and makes several convolutions around it, the provision of a set screw through the side of the hub is undesirable. According to the present invention, a locking screw is provided which extends through the front of the hub and is, hence, accessible without disturbing the hair spring; and which also has the advantage of being accessible from the front of the instrument without the necessity of placing the screw driver in an awkward position.

Two simple ways of accomplishing this are illustrated. In one, the screw is cone shaped on its inner end, the cone bearing on a ball which is thrust by the cone against the shaft to lock the hub to the shaft. In the other, the hub is partially split along a plane perpendicular to the axis of the shaft and a screw extends through the outer half of the hub and is threaded into the inner half to squeeze the two parts of the hub toward one another and thus grip the shaft.

Additional objects and advantages of the invention will be apparent from the following description and from the drawings in which.

Although the law requires a full and exact description of at least one form of the invention, such as that which follows, it is, of course, the purpose of a patent to cover each new inventive concept therein no matter how it may later be disguised by variations in form or additions of further improvements; and the appended claims are intended to accomplish this purpose by particularly pointing out the parts, improvements, or combinations in which the inventive concepts are found.

Figure 1:
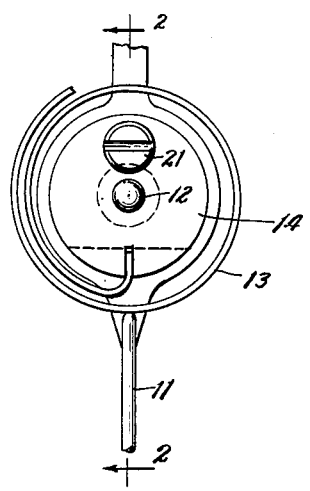
Figure 1 is a fragmentary, front, elevational view of an indicator unit embodying this invention.

In both illustrated forms of the invention, an indicator 11 is mounted on an instrument shaft 12. A hair spring 13 applies a biasing torque to the indicator 11 to urge the indicator to the zero position when the instrument is in such a condition that the indicator should read zero. The outer end of the hair spring 13 may be adjustable for this purpose. The inner end of the hair spring 13 is secured to a hub 14 forming part of the indicator, perhaps being secured by solder or an adhesive into a slot 16 in the hub. It will be observed from Fig. 1 that the hair spring extends all around the hub and hence makes the side of the hub relatively inaccessible for the insertion of a set screw therein.

Figure 2:
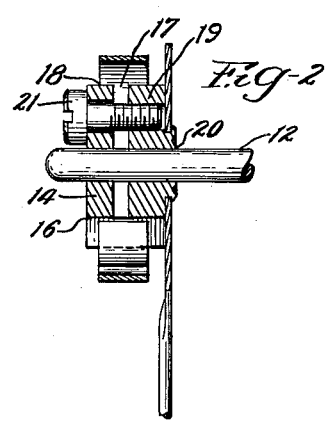
Fig. 2 is a fragmentary, sectional view taken approximately on the line 2—2 of Fig. 1.

According to the present invention, the indicator 11 may easily be adjusted with respect to the shaft 12 without disturbing the hair spring 13. The adjustment, once made, is dependably rigid. In the form of the invention shown in Figs. 1 and 2, a slot 17 is cut on a plane perpendicular to the axis of this hub 14, the slot extending nearly all of the way through the hub, or at least beyond the shaft-receiving bore 20, so as to provide a partially split or bifurcated hub having the two portions 18 and 19. Locking screw 21 passes through the portion 18 and is threaded to the portion 19. It will be clear that tightening the screw 21 will pinch the portions 18 and 19 toward one another. Inasmuch as the hole through the portions 18 and 19 fits the shaft 12 smoothly when the parts are relaxed, it is clear that pinching the portions 18 and 19 toward one another will firmly clamp the shaft 12 by producing a misalignment of the two bore portions through the portions 18 and 19.

Figure 3:
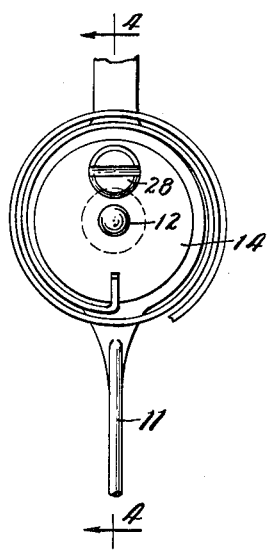
Figs. 3 and 4 are views corresponding to Figs. 1 and 2 but showing the invention in a different embodiment, which is at present preferred.
Figure 4:
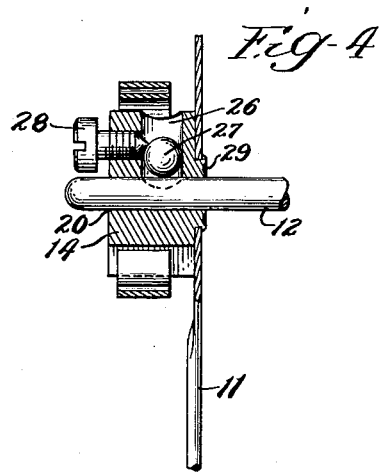

In Figs. 3 and 4 a cross bore 26 is provided into which a ball 27 is placed. The ball 27 is clamped against the shaft 12 by a locking screw 28 which is preferably conically shaped on its inner end to press the ball against the shaft as shown, thus locking hub 14 firmly on shaft 12.

One inherent advantage of the structure over conventional set screws is in minimizing the tendency of an indicator locking device to make a permanent depression in the shaft and seat itself back in this depression, turning the indicator on the shaft, if an attempt is made to shift the setting of the indicator on the shaft very slightly.

This tendency has been very troublesome in the past, sometimes thwarting efforts to make a delicate adjustment. The ball of the present invention minimized this tendency in two ways. First it is less likely to make the permanent depression, because it has no wiping or tearing action and no sharp corners. Second it is less likely to slip into a depression if it has made one in the past, because it does not rotate on the shaft surface. A rotating set screw reduces to zero any frictional force which would tend to keep it from sliding on the shaft. Furthermore any off-center irregularity on the set screw would, in effect, feel around to find the depression.

If convenient, the construction is preferably such as to prevent the ball from rolling out when the hub is not on the shaft. The opening of cross bore 26 into the main bore 20 may be incompletely drilled, or the ball 27 may be larger in diameter than the shaft 12 so that when the hub is off of the shaft, the ball 27 cannot roll out through the bore in hub 14 receiving shaft 12. Hair spring 13 blocks movement of the ball outwardly from cross bore 26 in case the lock screw 28 should be too far withdrawn.

From the foregoing it is seen that a pointer mounting has been provided in which the pointer may easily be adjusted with respect to a shaft and yet may be firmly and dependably locked thereto, the adjustment being made from the front rather than the side of the pointer so that access to the locking screw will not be obstructed by a hair spring surrounding the pointer hub or by any other obstructions.

We claim:

1. The combination of a shaft, an indicator and a hub mounted on the shaft, the hub having an axial bore receiving the shaft and a cross bore communicating therewith and open on one side of the hub, a ball in the cross bore, a screw generally parallel with the shaft and engaging the outer side of the ball to press it inwardly against the shaft and lock the hub to the shaft, and a hair spring secured to the hub and extending close to the outer end of the cross bore to prevent accidental passage of the ball outwardly from the cross bore in the event of removal of said screw.

2. The combination of a shaft, an indicator and a hub mounted on the shaft, the hub being rigid with the indicator and having an axial bore receiving the shaft and a cross bore communicating therewith and open on one side of the hub, a ball in the cross bore, and a screw generally parallel with the shaft and engaging the outer side of the ball to press it inwardly against the shaft and lock the hub to the shaft, the surface of said shaft where the hub is mounted thereon being cylindrical.

LOUIS A. PAINE.
WILLIAM J. DORSAM.

REFERENCES CITED

The following references are of record in the file of this patent:

UNITED STATES PATENTS

| Number | Name | Date |
|---|---|---|
| 361,323 | Rochow | Apr. 19, 1887 |
| 666,291 | Wardwell, Jr. | Jan. 22, 1901 |
| 1,008,086 | Storsberg | Nov. 7, 1911 |
| 1,116,455 | MacGahan | Nov. 10, 1914 |
| 1,244,848 | Gadke | Oct. 30, 1917 |
| 1,444,352 | Mason | Feb. 6, 1923 |
| 1,771,937 | Pettit | July 29, 1930 |
| 1,797,986 | King | Mar. 24, 1931 |
| 1,824,561 | Miller | Sept. 22, 1931 |
| 1,862,623 | Harrington | June 14, 1932 |
| 2,409,204 | Gall | Oct. 15, 1946 |